United States Patent
Ge et al.

(10) Patent No.: US 8,453,085 B2
(45) Date of Patent: May 28, 2013

(54) METHOD FOR ESTIMATING THE LATENCY TIME OF A CLOCK TREE IN AN ASIC DESIGN

(75) Inventors: Liang Ge, Shanghai (CN); Gong Qiong Li, Shanghai (CN); Suo Ming Pu, Shanghai (CN); Chen Xu, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 90 days.

(21) Appl. No.: 13/031,953

(22) Filed: Feb. 22, 2011

(65) Prior Publication Data

US 2012/0047478 A1    Feb. 23, 2012

(30) Foreign Application Priority Data

Feb. 26, 2010   (CN) .......................... 2010 1 0117747

(51) Int. Cl.
    *G06F 17/50* (2006.01)
(52) U.S. Cl.
    USPC ........... 716/108; 716/113; 716/122; 716/123; 716/129; 716/130; 716/134; 716/136; 703/16
(58) Field of Classification Search
    USPC ................. 716/108, 113, 122, 123, 129, 130, 716/134, 136; 703/16
    See application file for complete search history.

(56) References Cited

U.S. PATENT DOCUMENTS

| | | | | |
|---|---|---|---|---|
| 4,924,430 A | * | 5/1990 | Zasio et al. | 716/108 |
| 6,530,073 B2 | * | 3/2003 | Morgan | 716/102 |
| 6,550,045 B1 | * | 4/2003 | Lu et al. | 716/114 |
| 6,574,781 B1 | * | 6/2003 | Harada et al. | 716/114 |
| 6,698,006 B1 | * | 2/2004 | Srinivasan et al. | 716/114 |
| 6,769,104 B2 | * | 7/2004 | Rodgers et al. | 327/295 |
| 7,003,741 B2 | * | 2/2006 | Srinivasan | 716/113 |
| 7,127,695 B2 | * | 10/2006 | Huang et al. | 716/103 |
| 7,216,322 B2 | * | 5/2007 | Lai et al. | 716/114 |
| 7,296,246 B1 | * | 11/2007 | Kuehlmann et al. | 716/108 |
| 8,205,182 B1 | * | 6/2012 | Zlatanovici et al. | 716/125 |
| 8,271,929 B2 | * | 9/2012 | Laub | 716/132 |
| 8,332,793 B2 | * | 12/2012 | Bose | 716/114 |
| 2002/0162086 A1 | * | 10/2002 | Morgan | 716/18 |
| 2003/0051222 A1 | * | 3/2003 | Williams et al. | 716/12 |
| 2004/0015803 A1 | * | 1/2004 | Huang et al. | 716/10 |
| 2004/0210857 A1 | * | 10/2004 | Srinivasan | 716/2 |
| 2004/0225984 A1 | * | 11/2004 | Tsao et al. | 716/10 |
| 2006/0190886 A1 | * | 8/2006 | Lu et al. | 716/6 |

(Continued)

FOREIGN PATENT DOCUMENTS

JP            11194848 A  *  7/1999

*Primary Examiner* — Phallaka Kik
(74) *Attorney, Agent, or Firm* — H. Daniel Schnurmann

(57) ABSTRACT

Estimating the latency time of the clock tree of an ASIC including: providing a netlist and a placement related to the clock tree of the ASIC; extracting a number of the load timing devices connected by the clock tree according to the netlist related to the clock tree; extracting a physical distribution area of the load timing devices connected by the clock tree according to the placement related to the clock tree; estimating a latency time of the clock tree according to the relationship between the number of the load timing devices, the physical distribution area of the load timing devices and latency time of the clock tree in design data related to the ASIC design.

13 Claims, 9 Drawing Sheets

U.S. PATENT DOCUMENTS

| | | | |
|---|---|---|---|
| 2007/0283305 A1* | 12/2007 | Reddy et al. | 716/6 |
| 2008/0129362 A1* | 6/2008 | Kawai | 327/292 |
| 2008/0216043 A1* | 9/2008 | Hutzl et al. | 716/18 |
| 2009/0064067 A1* | 3/2009 | Liu et al. | 716/6 |
| 2009/0189641 A1* | 7/2009 | Toyonoh et al. | 326/93 |
| 2009/0217225 A1* | 8/2009 | Sunder et al. | 716/6 |
| 2009/0254874 A1* | 10/2009 | Bose | 716/6 |
| 2011/0209112 A1* | 8/2011 | Laub | 716/132 |
| 2011/0252389 A1* | 10/2011 | Albrecht et al. | 716/108 |
| 2012/0240091 A1* | 9/2012 | Sunder et al. | 716/113 |

* cited by examiner

METHOD FOR ESTIMATING THE LATENCY TIME OF A CLOCK TREE IN AN ASIC DESIGN

FIELD OF THE INVENTION

The invention relates generally to integrated circuit design, and more particularly, to a method and system for estimating the latency time of a clock tree and the arrival time of clock signals in an application specific integrated circuit (ASIC).

BACKGROUND

In the field of integrated circuit (IC) technology, an application specific integrated circuit (ASIC) refers to an IC circuit designed and manufactured in accordance with requirements set by the user and by the need for a specific electronic system. A key feature of ASIC is that it is primarily oriented to the needs of a specific user. When compared to a general purpose integrated circuit, it has the advantage of a smaller volume, lower power consumption, higher reliability, higher performance, enhanced privacy, and reduced cost, when mass produced.

FIG. 1 shows an illustrative flow of a conventional ASIC design. In step S101, a gate level netlist is generated. In step S102, a full placement is conducted to determine the physical locations and directions of all the standard gate units and other macros. In step S103, a STA (STA) is performed, preferably using an ideal clock model for clock effect estimation. This is the case because a clock tree has not yet been established by way of establishing a circuit model by extracting parasitics cannot be used to calculate the real arrival time of a clock signal at respective nodes, such that the ideal clock model becomes an approach for computing clock effect of the STA prior to the clock tree being inserted. In step S104, a clock tree is inserted. The clock tree insertion process can be done manually or by an electronic design automation (EDA) tool. For the most popular clock trees, it is preferably accomplished by automatic tools. Its basic principle is to select an appropriate grouping scheme and buffers according to the distance from the respective load timing devices to the clock source. Buffers are placed at a proper location such that the clock skew from the clock source to each load timing device is minimized. The inserted tree-like signal relay network is including buffers is referred to as a clock tree. If the inserted clock tree reaches or is close to the clock effect estimation in the ideal clock model, then the STA result after the clock insertion will be sufficiently close to the analysis result using an ideal clock model. Thus, convergence of timing is maintained and the effect on the design is attained. In step S105, timing analyses with a clock and clock tree adjustments are conducted. In step S106, wiring as well as timing convergence analysis following the wiring is performed. Finally, in step S107, a layout is generated, completing the primary design flow. However, the design flow of the aforementioned FIG. 1 encounters some problems in modern design of very large scale ASIC which are typically embodied in two aspects. In a first aspect, in an ideal clock model, it is always assumed that all the nodes of the same clock tree are to have the same (or very close to) arrival time. However, in a real clock network, this is often very difficult to achieve due to various complicated scenarios. Accordingly, the result obtained from the STA after the clock tree insertion has a noticeable difference with respect to previous ones, resulting in timing convergence failure and design failure. In this case, the ideal clock model often needs to be modified, and the modified model is used to conduct again a full placement, and only then, a clock tree is inserted. The difference between the real clock effect and an ideal clock model is reduced at the cost of increasing the iteration times. Generally, the clock tree insertion itself is time consuming, and such an iterative process further prolong significantly the design turnaround time.

On the other hand, as the scale of ASIC becomes significantly larger, the task of the clock tree insertion itself is increasingly time consuming. For Very Large Scale ASICs (e.g., having ten million gates), if a flatten design is used, the time consumed by the clock tree insertion is often computed in term of days or even weeks. This increases the time of discovering and solving the problems. The problems in both aspects result in excessively long product design period, which may result in losing advantageous market opportunity.

Therefore, there is a need for a method and a system that enables a designer to quickly determine the difference between inserting a clock tree and an ideal clock model as well as changes in the timing analysis results due to that difference, so as to reduce the design time.

SUMMARY

In one aspect, an embodiment of the invention provides a method and a system for estimating the latency time of a clock tree and arrival time of a clock signal in an ASIC, at which the check schedule can be shrunk from weeks to days, such that the designer can quickly identify and solve the problem, thereby reducing the design cycle and improving the design efficiency.

In another aspect of an embodiment, there is provided a method for estimating the latency time of the clock tree of an ASIC that includes: a) using a computer, providing a netlist and placement related to the clock tree of the ASIC; b) extracting a number of the load timing devices connected by the clock tree according to the netlist related to the clock tree; c) extracting the physical distribution area of the load timing devices connected by the clock tree; d) estimating the latency time of the clock tree according to the relationship between the number of the load timing devices, the physical distribution area of the load timing devices and the latency time of the clock tree in view of the history data of the same process as the ASIC.

In another aspect of an embodiment, there is provided a method for estimating the arrival time of a clock signal of an ASIC, including: a) using a computer, providing a netlist and placement information related to the clock signal of the ASIC; b) identifying all the clock trees related to the clock signal of the ASIC; c) estimating the latency time of each clock tree; d) providing the latency time of other devices in full clock path of the clock signal; e) summing up all the latency times of the full clock path of the clock signal to provide an estimated arrival time of the clock signal.

BRIEF DESCRIPTION OF THE DRAWINGS

The above and other objects, features and advantages of the invention will become more apparent from the detailed description of exemplary embodiments of the invention in the attached drawings, wherein same or similar reference numbers generally represent same or similar parts in the exemplary embodiments of the invention, in which.

DETAILED DESCRIPTION OF PREFERRED EMBODIMENTS

An embodiment of the invention will be described hereinafter in detail with reference to accompany drawings in which preferred embodiments are shown. However, the invention may be realized in various forms and should not be construed as limited to the embodiments described herein. Rather, the embodiments are provided for illustrative purposes only to enable the invention to be more apparent and complete, and fully convey scope of the invention to those skilled in the art.

Glossary of Terms

Hereinafter, are shown certain basic concepts that are defined to facilitate the description of embodiments of the invention.

Netlist: is a file or data structure representing the topology connection of devices of digital circuit, it does not include physical information of devices (such as, physical locations, direction, and the like, of devices).

Placement: file or data structure representing physical location information (such as, physical location, direction, and the like) of devices of a digital circuit.

Clock tree: the inserted tree-like signal relay network consisting of buffers is referred to a clock tree. Generally, an ASIC has one or more clock trees.

Latency time of the clock tree: for a single clock tree, the transfer time of clock signal from a root node to leaf node is latency time of the clock tree.

Arrival time of a clock signal: the required transfer time from the clock signal start at a chip input pad, traversing one or several clock trees and a clock net consisting of devices, arriving at a clock pad of a load timing device.

Clock tree effect: refers to the timing effect of the clock tree. It mainly includes latency of the clock tree and latency skew of the clock tree. The embodiments of the present invention preferably focus on the latency of the clock tree.

Figure 2:
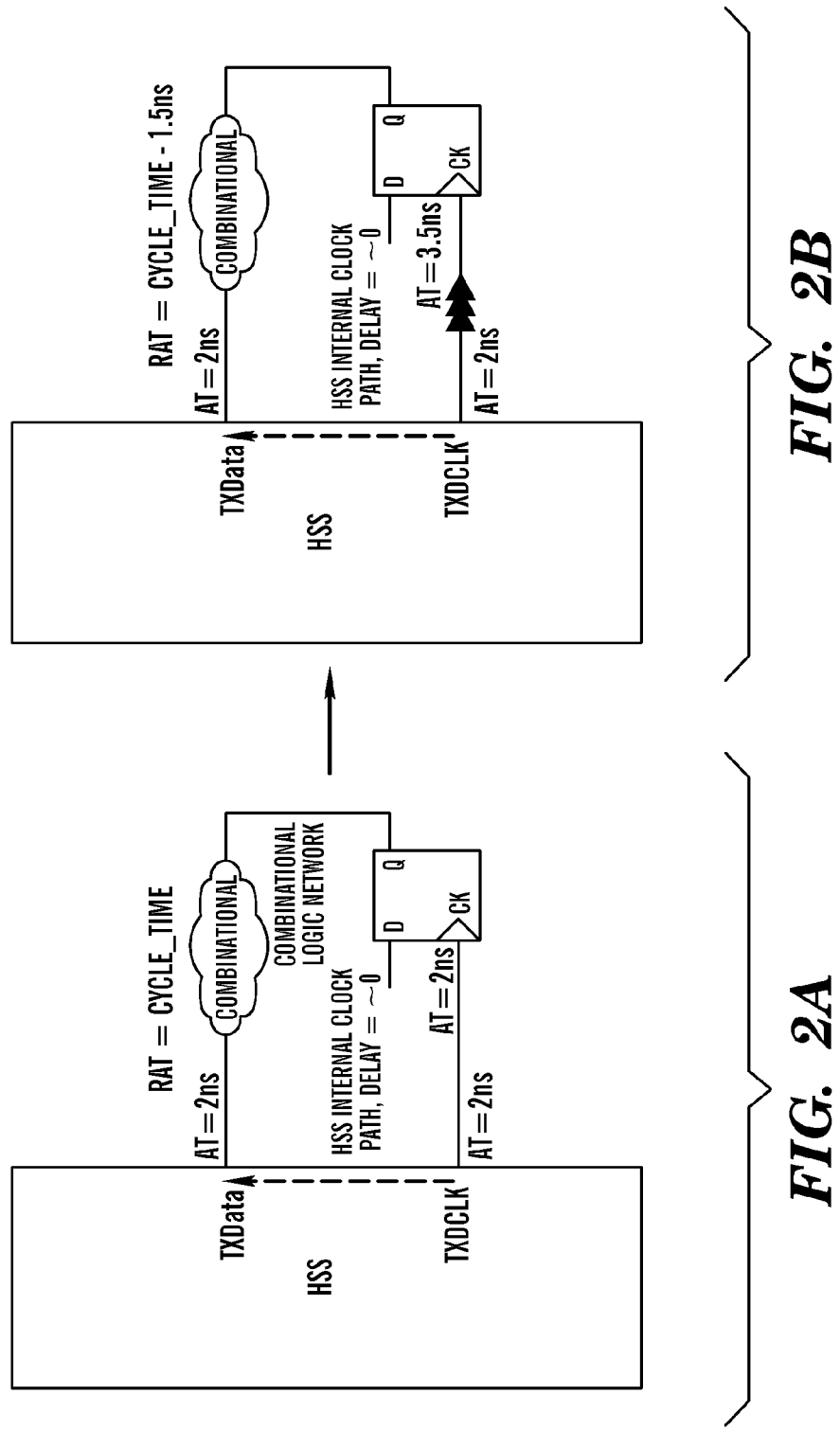
FIGS. 2a-2b illustrate a circuit topology under an ideal clock model.

Referring now to FIGS. 2a and 2b, they illustratively show a circuit topology using an ideal clock model. Herein, HSS is an IP core (intellectual property core) which is a segment of the hardware description language program with specific circuit functions. The program is independent of the integrated circuit process and may be migrated to different semiconductor process to create the integrated circuit chip.

TXDCLK is a clock output pad of the IP core. The clock signal is connected to a D flip-flop through a wire outside the IP core, and transferred to a sample point TXData through a short path within the IP core. For instance, TXData samples of the data signal of the D flip-flop transferred through a combinational logic network, with a sample frequency of the TXDCLK's clock signal.

Assuming that an ideal clock model sets the arrival time (AT) of all the nodes in the clock net to 2 ns. Then, in order to ensure that the TXData point can correctly sample the data, the total latency for a signal of D flip-flop to be transferred to the TXData point has to be contained within one clock cycle.

Following the insertion of the clock tree, a real topology relationship of the circuit is illustrated by reference to FIG. 2b. Since there are several buffers between TXDCLK and the clock terminal of the D flip-flop, the arrival time of clock signal at the clock terminal of the D flip-flop is greater than the arrival time of the clock signal of the TXDCLK point. Assuming that the arrival time of the clock terminal signal of the D flip-flop is, e.g., 3.5 ns (as shown in FIG. 2b), a direct consequence of the difference is that the transfer time required for the data signal to pass from the D flip-flop to the TXData terminal increases by 1.5 ns (3.5 ns-2.0 ns) relative to ideal transfer time. If the latency of the combinational logic network does not satisfy the stated requirement, then the TXData terminal cannot achieve the correct value.

Moreover, a change in the timing constraint condition on the signal transfer path after the clock tree insertion shown in FIG. 2b cannot be seen under the ideal clock model. A designer often needs to wait until the clock tree insertion has been completed to find that the timing constraint of the path from the D flip-flop to TXData is tighter than that of the ideal clock model. Thus, the designer has to conduct another iteration of the full placement, and compensate for the difference in the timing constraint derived from the clock tree insertion by reducing the distance from the D flip-flop and the IP core (HSS) or by optimizing the combinational logic circuit. However, the process time of using an EDA tool that inserts the clock tree to perform analysis is relatively long and can extend to weeks, resulting in prolonging the design time.

In the above example, since the clock is captured through the internal path of IP, its latency is significantly smaller than the latency of the clock tree inserted outside IP, such that the balance of the clock tree becomes unmanageable. Moreover, for such design as utilized from a gate control clock to trigger the flip-flop connected thereto, since the sample clock of the gate control clock device is a middle node of the clock tree, the balance of the clock arrival time of that node and other nodes cannot be realized. Furthermore, if the design of the clock net itself is overly complex, it can complicate balancing the clock tree to conform to the assumption that the arrival time of each node of the clock in the ideal clock model is to be uniform.

The development trend in an integrated circuit (IC) design makes the occurrence of the probability of the application to the above cases increasingly greater: (i) more chips extensively use a variety of IPs, making the case of the above examples occur frequently; (ii) gate control clock is known to be a low power-consumption design, while the requirement of a current large scale IC with respect to power consumption is increasingly strict, such that the use of gate control clock is commonly preferred; (iii) the function of modern Very Large Scale Integrated circuit designs is increasingly complicated, making the clock topology more complicated. Such complication renders the clock tree balancing more difficult, such that a significant difference exists between the timing status after clock tree insertion and the timing status under an ideal clock model. Such difference can further cause divergence in timing. More iteration may be required to return the timing back to converging that can cause a prolonged design cycle and increased design cost.

In view of the above, an embodiment of the present invention provides a method for estimating the latency time of the clock tree in the ASIC, the method estimating the latency time of a predetermined clock tree according to the design data. The method is shown in hereinafter in FIG. 3.

Figure 3:
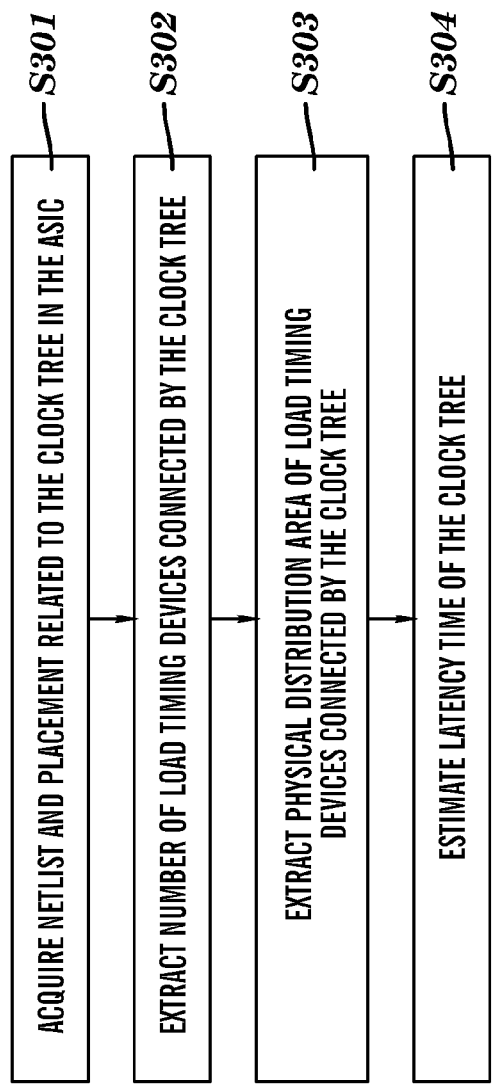
FIG. 3 shows a flow of an embodiment for estimating the latency time of the clock tree of the ASIC.

Referring to FIG. 3, an embodiment of a method is described wherein in step S301, the netlist and placements related to the clock tree of the ASIC are provided during the design process, the integrated circuit design tool providing the netlist and placement. Additionally, the designer may also provide the netlist and the placement of the ASIC. In this step, only the netlist and placement related to the clock tree are required. In particular, the netlist related to the clock tree includes at least source devices forming the clock tree, load timing devices and connections therebetween. The placement related to the clock tree preferably includes physical location information of the source and the sink of the clock tree. The source of the clock tree is a clock input terminal of the source devices forming the clock tree, and the sink of the clock tree is a clock output terminal of the source devices forming the clock tree.

In step S302, the number of the load timing devices connected by the clock tree is extracted according to the netlist related to the clock tree. Each device (including IP) of digital circuit has an identifier to determine whether it is a load timing device. The identifier is listed preferably in a design library. Thus, once the netlist related to the clock tree is provided, it can be determined whether it is a load timing device by simply checking the library files one by one, according to the type of device. As such, all the load timing devices connected to the clock tree can be extracted.

In step S303, a physical distribution area of the load timing devices connected by the clock tree is extracted according to the placement related to the clock tree. Following the load timing device list provided from the netlist related to the clock tree, the placement coordinates of the X and Y dimensions of a specified load timing device can be obtained by looking up the placement file (or data structure). The maximum and minimum value of placement coordinates of the X dimension and the maximum and minimum value of the placement coordinates of the Y dimension of the load timing devices connected to the clock tree are provided. Then, the absolute value of the difference between the maximum value of the placement coordinates of the X dimension of all the load timing devices connected to the clock tree and coordinates of the X dimension of the source of the clock tree is computed as a first absolute value. The absolute value of the difference between the maximum values of the placement coordinates of the Y dimension of the load timing devices connected to the clock tree and coordinates of the Y dimension of the source of the clock tree are computed as a second absolute value. The absolute value of the difference between the minimum value of placement coordinates of the X dimension of the load timing devices connected to the clock tree and coordinates of the X dimension of the source of the clock tree is computed as third absolute value. The absolute value of the difference between the minimum value of placement coordinates of the Y dimension of the load timing devices connected to the clock tree and coordinates of the Y dimension of the source of the clock tree is computed as fourth absolute value. Next, the greater value between the above first absolute value and the third absolute value, and the greater value between the second absolute value and the fourth absolute value are provided. Finally, the greater value between the first absolute value and the third absolute value and the greater value between the second absolute value and the fourth absolute value are summed to provide the physical distribution area of the set of devices.

By way of example, assuming that the clock tree drives five registers, Reg_0, Reg_1 ... Reg_4 respectively, the distribution coordinates $(x_0, y_0), (x_1, y_1) \ldots (x_4, y_4)$, the coordinates of the source of the clock tree $(X_{src}, Y_{src})$, and the computation of the physical distribution area of the load timing device is given by:

$$X\_latitude = \max\{abs(\max\{X_n\} - X_{src}), abs(\min\{X_n\} - X_{src})\}$$

$$Y\_latitude = \max\{abs(\max\{Y_n\} - Y_{src}), abs(\min\{Y_n\} - Y_{src})\}$$

$$Area = X\_latitude + Y\_latitude$$

wherein, n=0, 1, 2, 3, 4

The physical distribution area of the load timing devices is the sum of the X dimension and Y dimension rather than the product thereof, and the space of the wiring on the chip is preferably Manhattan Space rather than Euclidean Space.

In one embodiment, the coordinates of the X dimension of the source and coordinates of the Y dimension of the source are preferably provided by tracing back from the sink of the clock tree to the source of the clock tree. While tracing back, if a buffer is encountered, then the buffer is skipped, tracking input terminal connection of the buffer. If one of the primary inputs of the chip, the output pad of the timing device, the output pad of the phase locked loop or topology node defined as clock source is encountered, then tracing back is interrupted, marking tracing back point as a source of the clock tree, thereby providing the coordinates of the X and Y dimensions of the source. The topology node of the source of clock is preferably defined by the designer, a typical example of which is an output of the multiplexer (MUX). Generally, the designer may elect to define MUX as the source of the clock tree. It is noted that in the present case, the device encountered while tracing back is considered "timing device" rather than "load timing device". In a chip, a timing device may be employed to generate the clock signal, the output terminal of the timing device becoming the root node of the clock tree. The "load timing device" refers to the load of the clock tree while tracing back, since the direction is directed towards the source it becomes impossible to encounter the load device of the clock.

In step S304, the latency time of the clock tree is determined according to the relationship between the number of the load timing devices, the physical distribution area of the load timing devices and the latency time of the clock tree of the ASIC. During the implementation, the relationship between the numbers of the load timing devices, the physical distribution area of the load timing devices and the latency time of the clock tree of the ASIC design may first be stored. More particularly, a database (or a simpler list) may be used and stored in memory (or in a file). In the following implementation, it is assumed that the above data is stored in a table. For instance, Table 1, illustratively shows a history data list of latency time of the clock tree, wherein the horizontal coordinate of the table represents the number of load timing devices forming the clock tree, the vertical coordinate is a physical distribution area of the load timing device, and the value in the table represents the latency time of the clock tree.

In particular, after determining the history data as shown in Table 1, the latency time of the clock tree can be estimated by looking up the table. If there is no specific value of latency time of the clock tree corresponding to the number of load timing devices and the physical distribution area of the load timing devices of a predetermined clock signal in the history data, then the latency time of the clock tree can be determined by interpolation.

Figure 4:
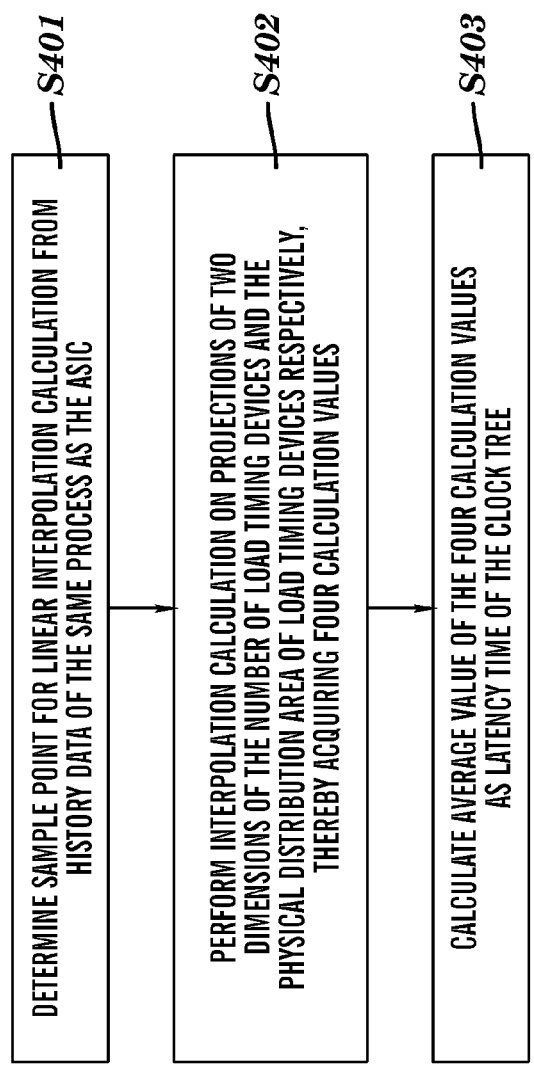
FIG. 4 depicts a flow of an actual linear interpolation.

A detailed flow of actual linear interpolation is shown in FIG. 4, wherein in step S401, a sample point for linear interpolation computation is determined from the history data of the same process as the ASIC, according to the number of load timing devices and the physical distribution area of the load timing devices of the clock tree required to be computed. For example, the number of the load timing devices of the clock tree (e.g., tree_a) is 2800 and the physical distribution area of the load timing devices thereof is 3.2 mm. Sample nodes can be used to calculate the linear interpolation of the four points (a), (b), (c), (d) in Table 1.

TABLE 1

History data of latency time of the clock tree

| physical distribution area of the load timing devices | number of the load timing devices | | | |
|---|---|---|---|---|
| | 1000 | 2000 | 3000 | 5000 |
| 1 mm² | 1.0 ns | 1.2 ns | 1.5 ns | 1.8 ns |
| 2 mm² | 1.2 ns | 1.5 ns$^{(a)}$ | 1.8 ns$^{(b)}$ | 2.0 ns |
| 4 mm² | 1.5 ns | 1.8 ns$^{(c)}$ | 2.0 ns$^{(d)}$ | 2.2 ns |

In step S402, the interpolation is conducted on the projections of two dimensions of the number of the load timing devices and the physical distribution area of the load timing devices, such as the above (2800, 3.2 mm) The four computation values are provided as shown hereinafter where x is used to represent the interpolated latency time of the clock tree.

$$\text{Latency}(0) = \text{Latency}(a) + \left[\frac{Fanout(x) - Fanout(a)}{Fanout(b) - Fanout(a)}\right] * [\text{Latency}(b) - \text{Latency}(a)]$$

$$\text{Latency}(1) = \text{Latency}(c) + \left[\frac{Fanout(x) - Fanout(c)}{Fanout(d) - Fanout(c)}\right] * [\text{Latency}(d) - \text{Latency}(c)]$$

$$\text{Latency}(2) = \text{Latency}(a) + \left[\frac{Area(x) - Area(a)}{Area(c) - Area(a)}\right] * [Area(c) - Area(a)]$$

$$\text{Latency}(3) = \text{Latency}(b) + \left[\frac{Area(x) - Area(b)}{Area(d) - Area(b)}\right] * [Area(d) - Area(b)]$$

In step S403, the average value of the four computation values Latency(0), Latency(1), Latency(2), Latency(3) are determined, and x value is provided.

$$\text{Latency}(x) = \text{Avg}(\text{Latency}(n))$$

For a simple illustration of the linear interpolation, the above method is described as follows: if it is designed that there is one clock signal in an object chip, and number of the load timing devices is 2500, and the physical distribution area of its load timing devices is 1.5 mm², then AT=(1.2 ns+1.5 ns+1.5 ns+1.8 ns)/4=1.5 ns.

Figure 5:
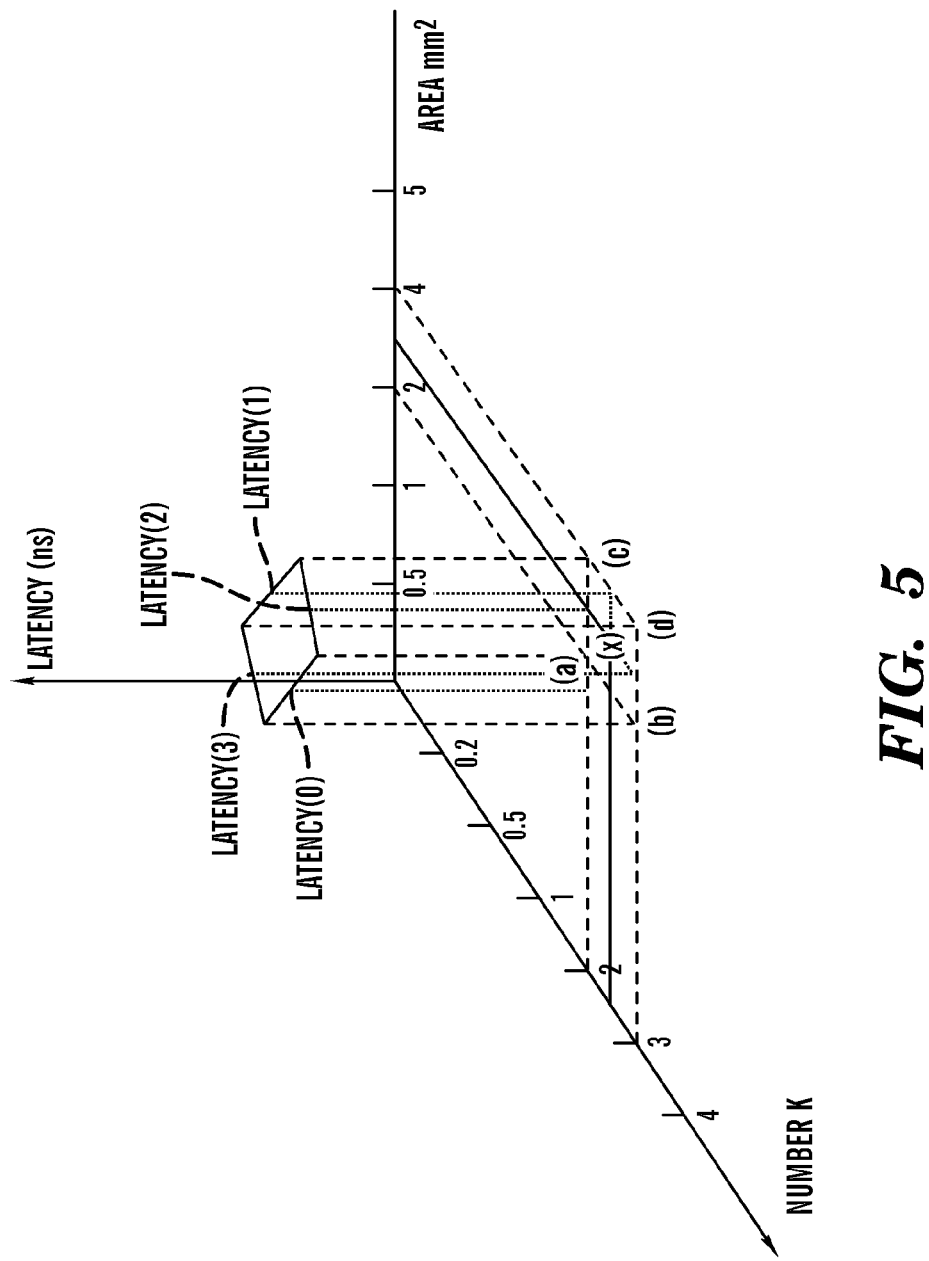
FIG. 5 illustrates the computation relationship of linear interpolation computation.

FIG. 5 illustratively shows the computation relationship of linear interpolation computation. It will be appreciated that the linear interpolation is one only one form thereof, and other interpolations, such as a spline or quadratic interpolation, etc. also can be used to estimate the latency time of the clock tree.

Figure 6:
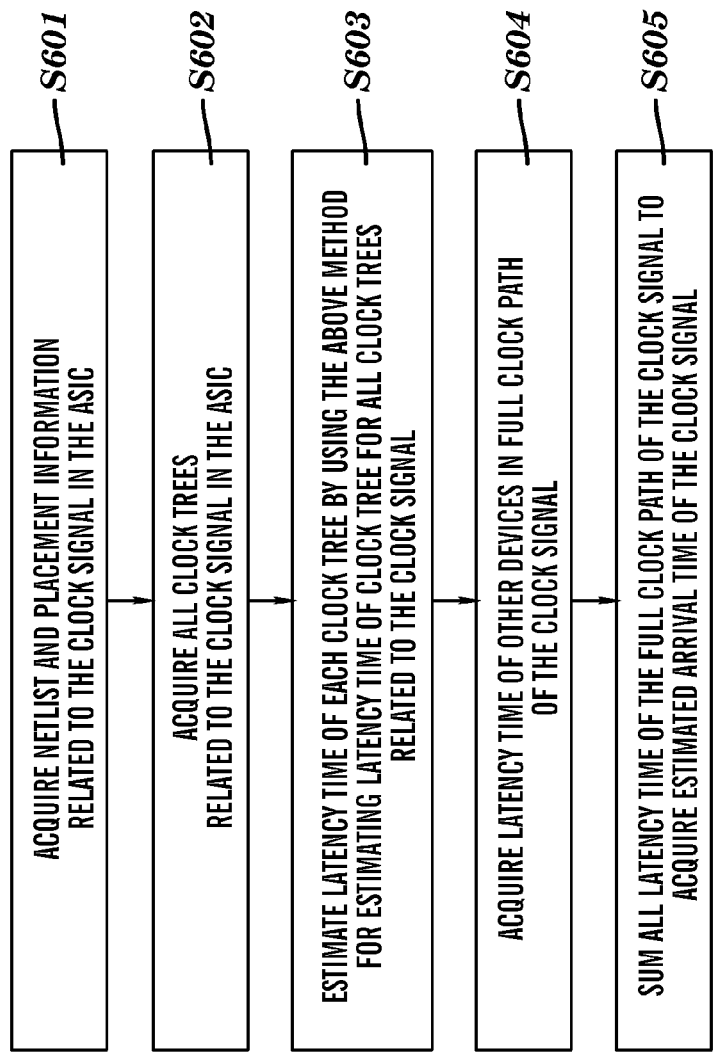
FIG. 6 shows a flow chart of an embodiment of the invention for determining the arrival time of the clock signal of the ASIC.

Following the above estimating latency time of the clock tree, the arrival time of the clock signal can be quickly estimated. For an ASIC, it is required to sum arrival time of all clock trees while conducting STA to provide an accurate arrival time of the entire clock net so as to judge whether there exists a timing violation in the clock net. Thus, to estimate the latency time of the clock tree, determining the arrival time of clock signal of the ASIC can be provided, by quickly estimating the arrival time of the clock signal the ASIC to determine whether there is a timing violation in the inserted clock tree and whether timing convergence exists. The method is shown in FIG. 6, wherein:

In step S601, the netlist and placement related to the clock signal of the ASIC are provided. The netlist and placement data related to the clock signal includes the topology and physical location information of the load timing and other devices along the clock net transfer path, the other devices including input and output buffer (IC)), phase locked loop (PLL) and other IPs. In step S602, all clock trees related to the clock signal of the ASIC are provided.

In step S603, for all clock trees related to the clock signal, the latency time of each clock tree is estimated by using the above method for estimating the latency time of the clock tree. In step S604, the latency time of other devices along the full clock path of the clock signal are provided, wherein the 'full clock path' refers to a path in which the clock signal originates from the primary input (i.e., input pad of chip), passing through clock generation devices in the chip, mainly the phase locked loop, the frequency dividing register or other IP core. Typically, the latter two can be generalized as "timing devices", arriving at the clock input terminal of the load timing device. The full clock path consists of two parts: the first including one or more clock trees, and the second consisting of devices connecting the respective clock trees. Since a signal on a chip pad traverses at least one input and output buffer (I/O buffer), the full clock path of any clock signal will at least include device latency time of input buffer. Furthermore, other devices can also include a phase locked loop (PLL), IP core, and the like. The latency time of respective devices can be directly provided through latency model of device.

In step S605, the latency time of the full clock path of the clock signal is summed up to provide the estimated arrival time of the clock signal. All latency time include latency of the clock tree and latency of other devices in the full clock path. If the above method is incorporated in the IC design tool, the estimated arrival time of respective clock signals can be marked on respective nodes of clock net when step S605 is performed. The identifier may be accomplished through commands of the STA tool, as by way of example using IBM Einstimer™ tool:

et::set_arrival-pin xxx-rise-arrival_time 2.2 ns et::setarrival-pin yyy-rise-arrival_time 2.2 ns, such that the ideal clock AT set on the same clock signal by the ideal clock model is changed. Thus, design tool can perform a timing check according to the clock arrival time on the clock node and determines whether there is timing violation in the respective data path.

Figure 7:
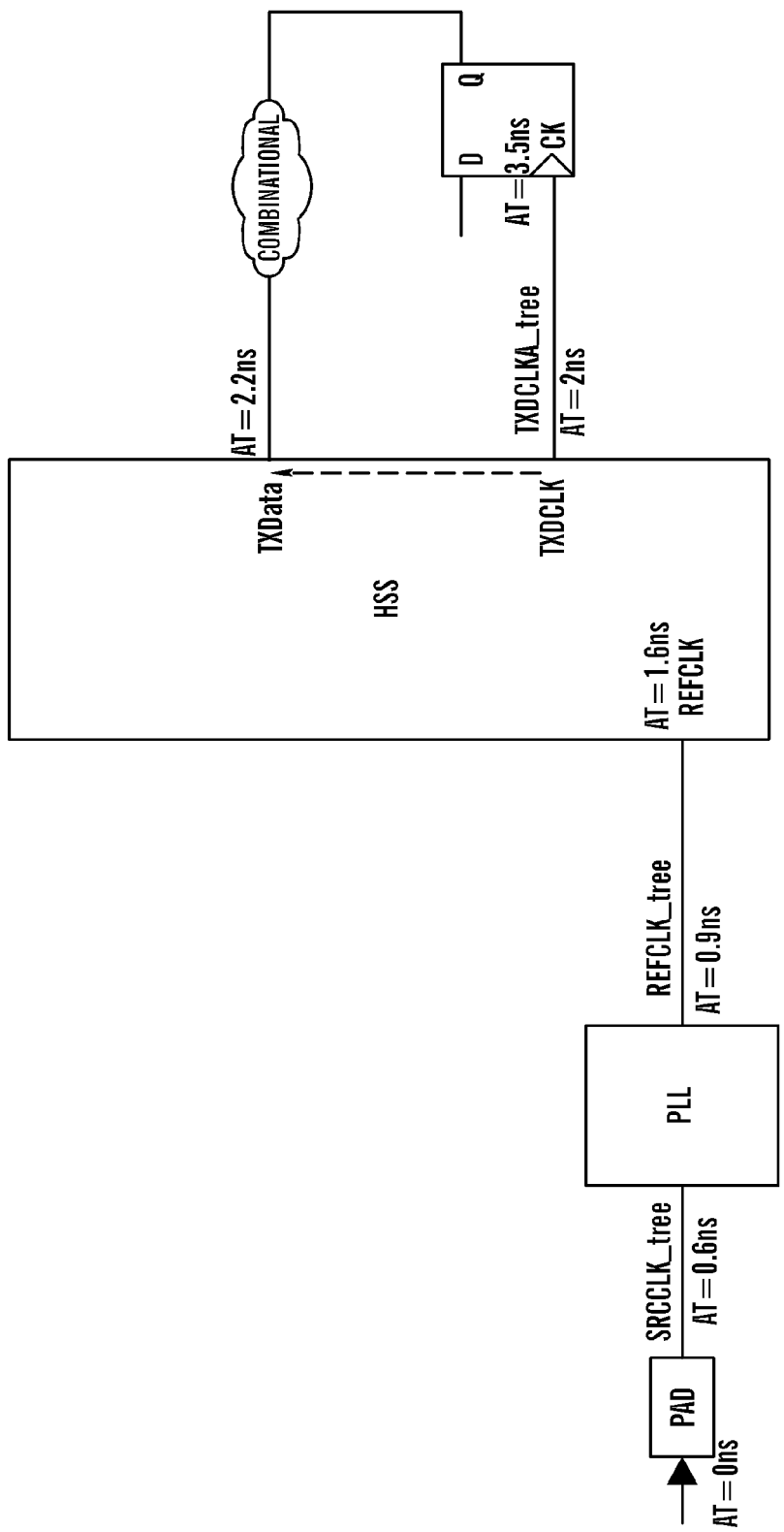
FIG. 7 is an illustrative sample of the ASIC design.

FIG. 7 illustrates an example of an ASIC design in order to explain the specific implementation of the above method for determining arrival time of clock signal. There are three clock trees, labeled as SRCCLK_tree, REFCLK_tree, and TXD-CLKA_tree respectively; the estimated latency time of these three clock trees being provided by using the method for estimating the latency time of the clock tree as shown in FIG. 3. However, if the AT of the clock signal of the flip-flop depicted at the right side is to be provided, it is also needed to sum the latency time of the full clock path from the input pad of chip to the clock terminal of the flip-flop, i.e., clock arrival time of flip-flop=clock arrival time of the chip pad (generally defined as 0)+pad buffer latency+SRCCLKtree_latency+phase locked loop (PLL) latency+REFCLK_tree latency+macro (HSS) latency+TXDCLKA_tree latency.

The device latency in the clock path can be directly provided through the device latency model, plus the estimated value of latency time of the clock tree. The clock AT of any intermediate node or terminal node of the clock tree can be provided by way of summing the various components. The analysis result is more close to real status after inserting clock tree than that of the STA ideal clock model.

Figure 1:
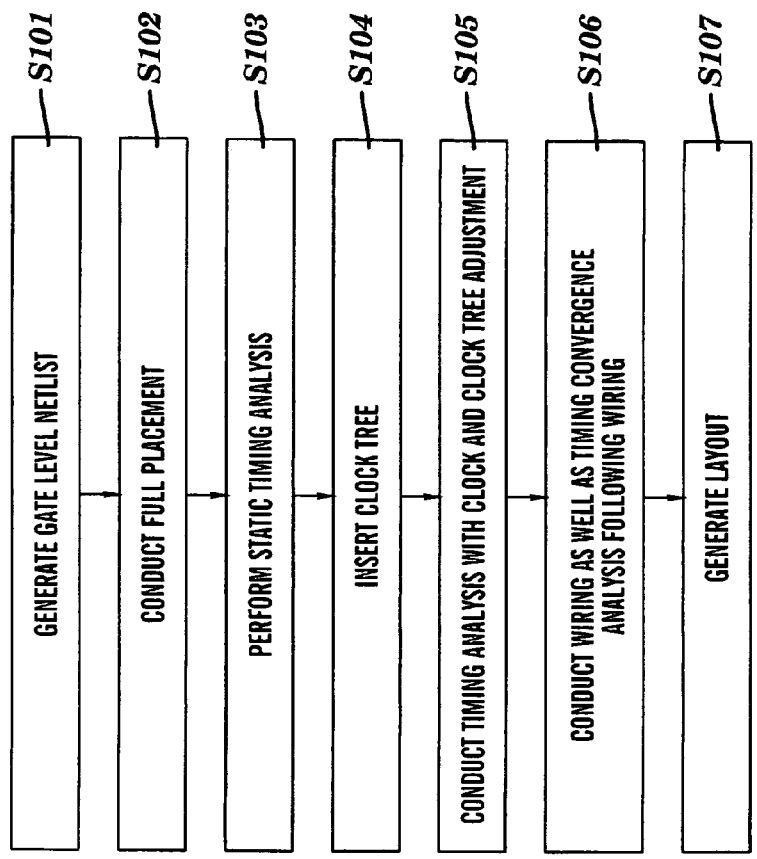
FIG. 1 shows a flow of a prior art ASIC design.

The above method for judging whether the clock tree inserted is convergent may be embedded in the existing ASIC design flow as shown in FIG. 1 between the placement of step S102 and the STA step S103. The timing analysis is performed by identifying an estimated AT of the clock node after inserting the clock tree. The analysis result may be directly used for adjustment of placement and clock distributing scheme. The timing analysis result of the ideal clock model is sufficiently close to the timing result following the estimated clock effect following the insertion of the clock tree. Since the computation time of the estimated clock effect is much smaller than the time of the real clock tree insertion, even when there is iteration the consumed time is much smaller than the iteration process containing the clock tree insertion. Thus, risk of delaying design period can be significantly reduced.

Figure 8:
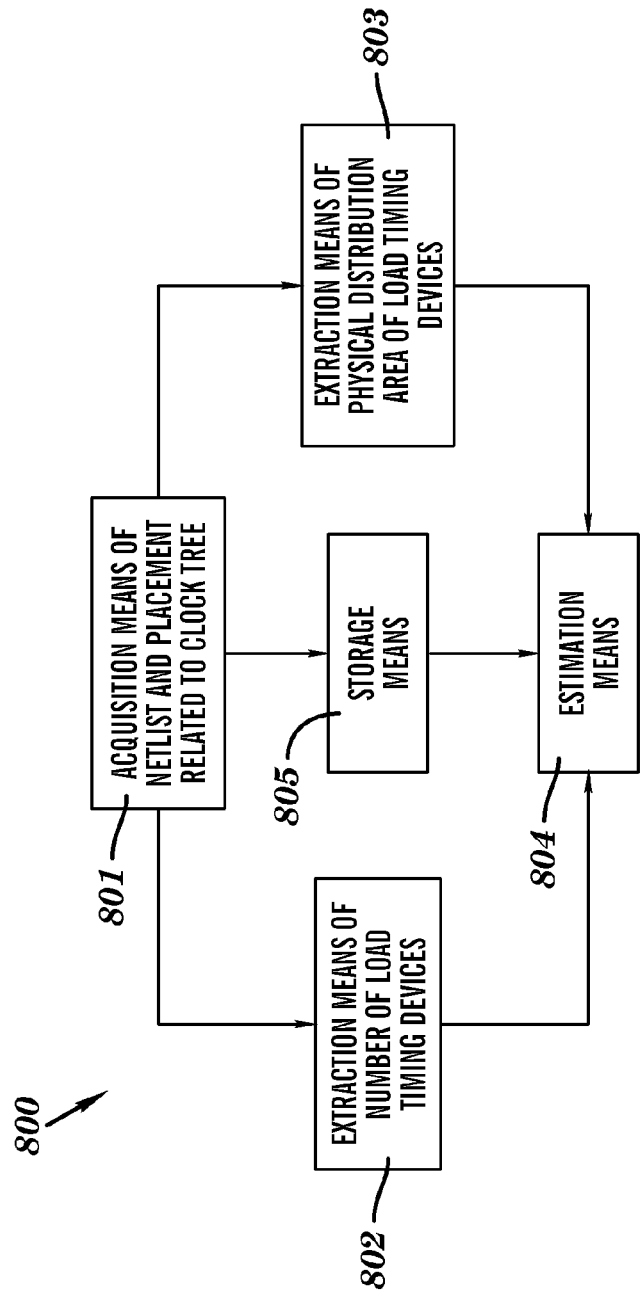
FIG. 8 shows a block diagram of a system for estimating the latency time of the clock tree of the ASIC.

An embodiment of the invention, a system 800 is provided for estimating the latency time of the clock tree, wherein the block diagram of the system is shown as FIG. 8. The system includes acquisition means 801 of the netlist and placement related to the clock tree for providing the netlist and placement related to the clock tree; extraction means 802 of the number of the load timing devices for extracting the number of the load timing devices connected to the clock tree according to the netlist related to the clock tree; extraction means 803 of the physical distribution area of the load timing devices for extracting physical distribution area of the load timing devices connected by the clock tree according to the placement related to the clock tree; estimation means 804, for estimating the latency time of the clock tree according to the relationship between the number of the load timing devices, the physical distribution area of the load timing devices and the latency time of the clock tree as a function of the history data of the same process. The netlist related to the clock tree includes source devices forming the clock tree and load timing devices and a connection relationship thereof, the placement related to the clock tree includes physical location information of the source and the sink of the clock tree. Herein, the source of the clock tree is a clock input terminal of the source devices forming the clock tree, and the sink of the clock tree is the clock output terminal of the source devices forming the clock tree.

Preferably, the system further comprises storage means 805, for storing the relationship between the number of the load timing devices, the physical distribution area of the load timing devices and the latency time of the clock tree based on the history data of the same process as the ASIC. In one embodiment, within the storage means, the relationship between the number of the load timing devices, the physical distribution area of the load timing devices and the latency time of the clock tree in the history data of the same process as the ASIC is stored preferably in the form of a table, and the latency time of the clock tree is estimated by looking up the table in the estimation means. If there is no specific value of latency time of the clock tree corresponding to number of the load timing devices, physical distribution area of the load timing devices of specific clock signal in the history data, latency time of the clock tree are estimated by way of interpolation.

If the latency time of the clock tree is estimated by way of interpolation, a variety of interpolations can be employed, such as a linear interpolation, a quadratic interpolation, a spline interpolation, and the like. If the linear interpolation is employed, then the sample point for the computation is first determined from the history data of the same process as the ASIC, according to the extracted number of the load timing devices and the physical distribution area of the load timing devices of the clock tree; then the interpolation computation is conducted on projections of two dimensions of the number of the load timing devices and the physical distribution area of the load timing devices, thereby providing four computation values. Finally, the average value of the four computations is computed as the estimated latency time of the clock tree.

In one embodiment, extraction means 802 to extract the number of load timing devices further comprises: (not shown in FIG. 8) acquisition means providing the list of the load timing devices connected to the clock tree.

In another embodiment, the extraction means 803 of the physical distribution area of the load timing devices first provides placement coordinates of the X dimension and Y dimension of the load timing devices connected to the clock tree; then provides maximum and minimum values of placement coordinates of the X dimension and maximum and minimum value of the placement coordinates of the Y dimension of the load timing devices connected to the clock tree; then calculates the absolute value of the difference between the maximum value of placement coordinates of the X dimension of the load timing devices connected to the clock tree and the coordinates of the X dimension of the source of the clock tree as a first absolute value; calculates the absolute value of the difference between the maximum value of placement coordinates of the Y dimension of the load timing devices connected to the clock tree and coordinates of the Y dimension of the source of the clock tree as the second absolute value; calculates the absolute value of the difference between the minimum value of placement coordinates of the X dimension of the load timing devices connected to the clock tree and coordinates of the X dimension of the source of the clock tree as third absolute value; calculates the absolute value of the difference between the minimum value of placement coordinates of the Y dimension of the load timing devices connected to the clock tree and coordinates of the Y dimension of the source of the clock tree as fourth absolute value; then provides the greater value between the above first absolute value and third absolute value and a greater value between the above second absolute value and fourth absolute value; and sums the provided greater value between the first and third absolute values and the greater value between the second and fourth absolute values to provide the physical distribution area of the set of devices.

In one embodiment, the extraction means of the physical distribution area of the load timing devices further comprises tracing back means (not shown in FIG. 8), for tracing back from sink of the clock tree to source of the clock tree, if one of primary input of chip, output pad of timing device, output pad of phase locked loop, or topology node defined as root node of clock is encountered during tracing back, then stopping tracing back, marking tracing back point as the source of the clock tree, thereby providing coordinates of the X dimension of the source and coordinates of the Y dimension of the source.

Figure 9:
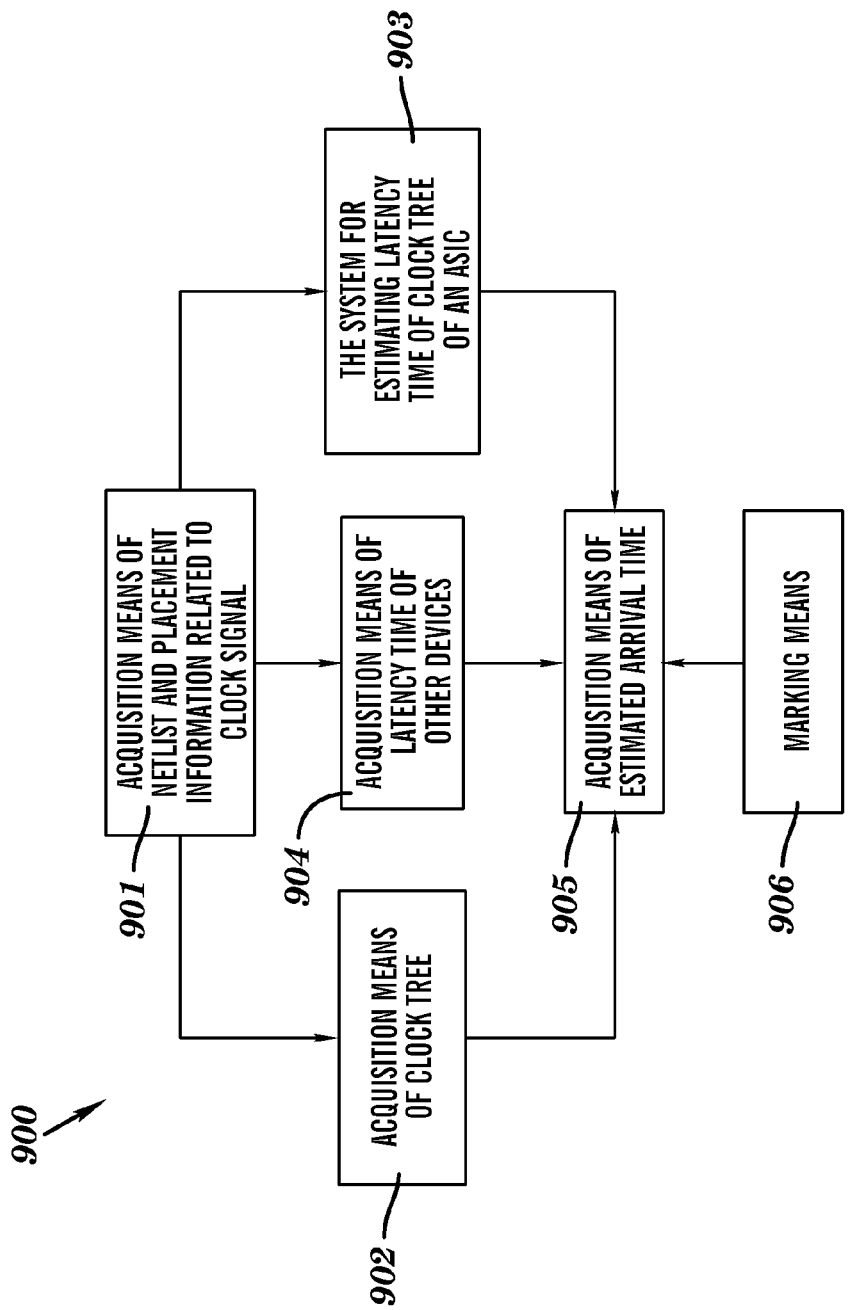
FIG. 9 is a block diagram of a system of an embodiment of the present invention for estimating the arrival time of clock signal of the ASIC.

An embodiment further discloses system 900 for estimating the arrival time of the clock signal of an ASIC. The block diagram of the system is shown as FIG. 9. The system includes: acquisition means 901 of the netlist and placement information related to the clock signal for providing the netlist and placement information related to the clock signal of the ASIC; acquisition means 902 clock tree for providing all the clock trees related to the clock signal of the ASIC; the system 903 for estimating latency time of the clock tree of ASIC, for estimating the latency time of the clock tree; acquisition means 904 of the latency time of other devices, for providing the latency time of other devices in the full clock path of the clock signal; acquisition means 905 of the estimated arrival time, for summing all the latency times of the full clock path of the clock signals to provide an estimated arrival time of the clock signal. Preferably, the system further includes marking means 906 for marking the estimated arrival time of respective clock signal on respective node of clock net. In the system, other devices can include input and output buffer (10), phase locked loop (PLL), IP cores, and the like.

Although exemplary embodiments of the invention are described with reference to accompany drawings, it should be appreciated that the invention is not limited to these precise embodiments, and those skilled in the art can make various changes and modifications to the embodiments without departing from the scope and spirit of the invention. It is intended that all such changes and modifications to be encompassed in the scope of the invention defined by the appended claims. The present invention may be embodied as a system, method or computer program product. Accordingly, the present invention may take the form of an entirely hardware embodiment, an entirely software embodiment (including firmware, resident software, microcode, and the like) or an embodiment combining software and hardware aspects that are generally referred to as a "circuit," "module" or "system." Furthermore, an embodiment may take the form of a computer program product embodied in any tangible medium of expression having computer usable program code embodied in the medium. Any combination of one or more computer usable or computer readable medium(s) may be utilized. The computer-usable or computer-readable medium may be, for example but not limited to an electronic, magnetic, optical, electromagnetic, infrared, or semiconductor system, apparatus, device, or propagation medium. More specific examples of the computer-readable medium can include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium can include paper or another suitable medium upon which the program is printed, as the program can be electronically captured via, e.g., optical scanning of the paper or other medium, then compiled, interpreted, or otherwise processed in a suitable manner, if necessary, and then stored in a computer memory. A computer-usable or computer-readable medium may be any medium that can contain, store, communicate, propagate, or transport the program for use by or in connection with the instruction execution system, apparatus, or device. The computer-usable medium can include a propagated data signal with the computer-usable program code embodied therewith, either in baseband or as part of a carrier wave. The computer usable program code may be transmitted using any appropriate medium, including but not limited to wireless, wireline, optical fiber cable, RF, and the like.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Further, each block of the flowchart and/or block diagram, and combinations of blocks in the flowchart and/or block diagram of the invention, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the drawings illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention claimed:
1. A method for estimating a latency time of a clock tree of an ASIC design, comprising: a) using a computer, providing a netlist and placement information related to said clock tree; b) based on said netlist, selecting load timing devices connected to said clock tree; c) determining a physical distribution area of said load timing devices according to said placement information related to said clock tree;

and d) using a computer, estimating said latency time of said clock tree according to a relationship between said selected load timing devices and said physical distribution area of said load timing devices, wherein said latency time of said clock tree is determined by history data of semiconductor process for said ASIC.

2. The method according to claim 1, further comprising said netlist related said clock tree which includes source devices forming said clock tree and load timing devices and connecting relationship thereof, said placement related to said clock tree comprising physical location information of sources and sinks of said clock tree, wherein said source of the clock tree is a clock input terminal of said source devices forming said clock tree, and said sink of the clock tree is a clock output terminal of said source devices forming said clock tree.

3. The method according to claim 2, wherein determining a number of the load timing devices according to said netlist related to said clock tree further comprises providing a list of the load timing devices connected to said clock tree.

4. The method according to claim 2, wherein extracting said physical distribution area of the load timing devices connected by said clock tree comprises:

providing placement coordinates of X and Y dimensions of the load timing devices connected to said clock tree; providing maximum and minimum values of said placement coordinates of said X dimension and maximum and minimum values of said placement coordinates of said Y dimension of the load timing devices connected to said clock tree;

computing an absolute value of a difference between the maximum value of placement coordinates of the X dimension of the load timing devices connected to said clock tree and coordinates of the X dimension of the source of the clock tree as a first absolute value; computing the absolute value of the difference between the maximum value of the placement coordinates of the Y dimension of the load timing devices connected to said clock tree and the coordinates of the Y dimension of the source of the clock tree as a second absolute value; computing the absolute value of the difference between the minimum value of placement coordinates of the X dimension of the load timing devices connected to said clock tree and the coordinates of the X dimension of the source of the clock tree as a third absolute value; computing the absolute value of the difference between the minimum value of placement coordinates of the Y dimension of the load timing devices connected to said clock tree and the coordinates of the Y dimension of the source of the clock tree as a fourth absolute value; providing a greater value between said first absolute value and the third absolute value and the greater value between said second absolute value and said fourth absolute value; and summing said provided greater value between said first absolute value and said third absolute value and said greater value between said second absolute value and said fourth absolute value to provide said physical distribution area of said devices.

5. The method according to claim 4, wherein the coordinates of the X dimension of the source and the coordinates of the Y dimension of the source are determined by tracing back from said sink of said clock tree to said source of said clock tree; and if one of primary inputs, output pad of a timing device, output pad of a phase locked loop, or a topology node defined as root node of clock is encountered during tracing back, then stopping said tracing back, marking tracing back point as a source of said clock tree, providing coordinates of the X dimension of said source and coordinates of the Y dimension of said source.

6. The method according to claim 1 further comprising storing said relationship between a number of the load timing devices, said physical distribution area of the load timing devices and said latency time of the clock tree of said ASIC design.

7. The method according to claim 6, wherein said relationship between the number of the load timing devices, the physical distribution area of the load timing devices and the latency time of the clock tree of said ASIC design is stored in a table, and said latency time of said clock tree is extracted from said table.

8. The method according to claim 6, wherein if there is no predetermined value of said latency time of the clock tree corresponding to said load timing devices, said physical distribution area of the load timing devices of specific clock signal from design data, an estimating said latency time of said clock tree is obtained by interpolation.

9. The method according to claim 8, wherein said estimating said latency time of said clock tree through interpolation comprises employing a linear interpolation, said linear interpolation comprising: determining a sample point for said linear interpolation computation from said ASIC design according to said extracted number of the load timing devices and said physical distribution area of said load timing devices of said clock tree; performing said interpolation computation on projections of two dimensions of said number of load timing devices and said physical distribution area of the load timing devices respectively, providing four computation values; and computing an average value of said four computation values as said estimated latency time of said clock tree.

10. A method for estimating an arrival time of clock signal in an ASIC, comprising: providing netlist and placement information related to said clock signal; providing all clock trees related to said clock signal; estimating a latency time of each clock tree for all said clock trees related to said clock signal; providing said latency time of other devices in a clock path of said clock signal; and using a computer summing all said latency times of said clock path of said clock signal to provide an estimated arrival time of said clock signal, wherein said latency time of said clock tree is determined by history data of semiconductor process for said ASIC.

11. The method according to claim 10, wherein others of said devices include input and output buffer (10), phase locked loop (PLL) and IP cores.

12. The method according to claim 10, further comprising marking said estimated arrival time of the respective clock signal of a respective node of a clock net.

13. A computer program product comprising ) a non-transitory computer readable medium having program codes stored thereon, which when executed by a computer, causes the computer to perform a method for estimating a latency time of a clock tree of an ASIC design, said method comprising: a) providing netlist and placement information related to said clock tree; b) selecting load timing devices connected to said clock tree list based on said netlist; c) determining a physical distribution area of said load timing devices according to said placement information related to said clock tree; and d) estimating said latency time of said clock tree according to a relationship between said selected load timing devices, said physical distribution area of said load timing devices, wherein said latency time of said clock tree is determined by history data of semiconductor process for said ASIC.

* * * * *